Figure 1:
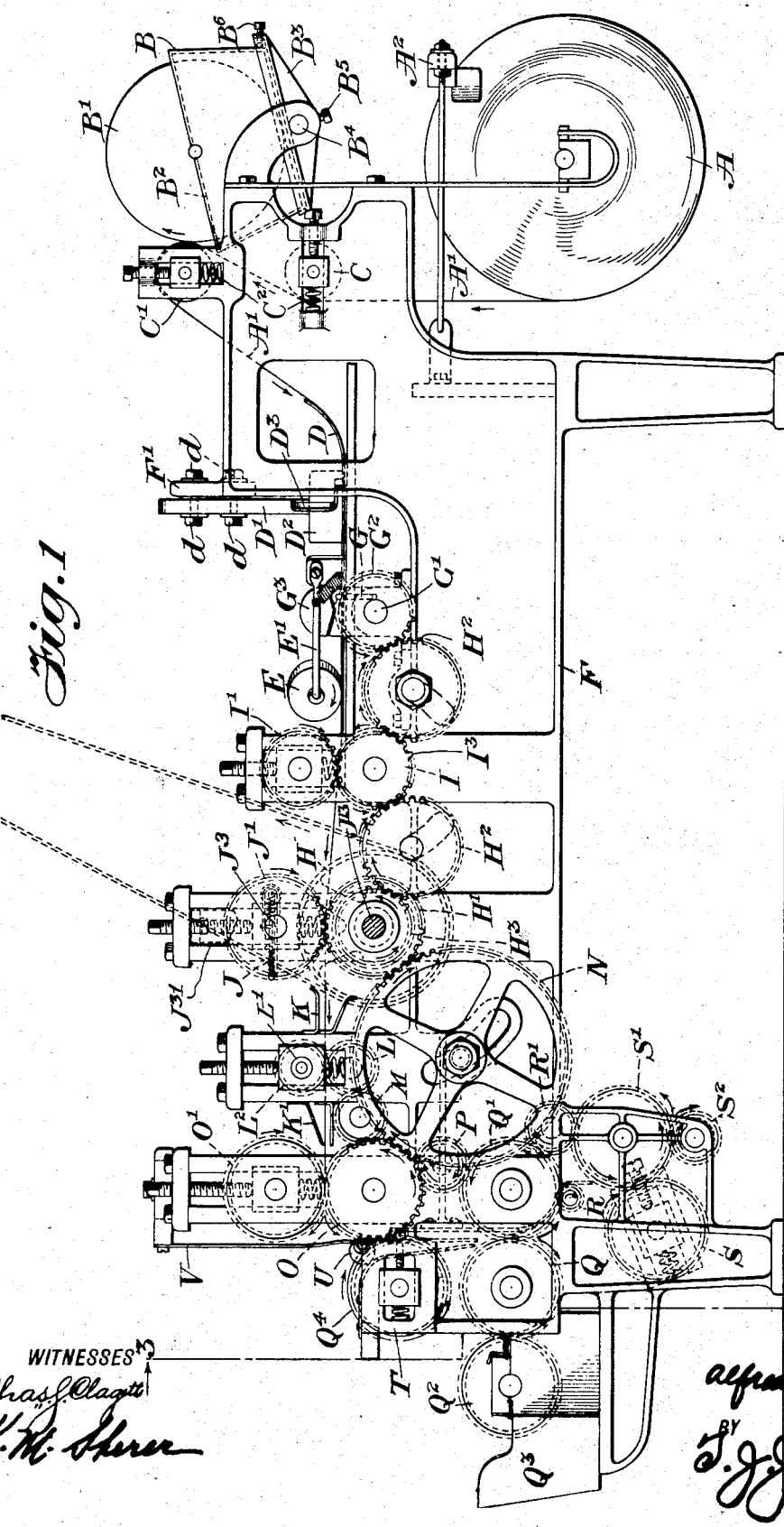

A. C. COTY.
MACHINE FOR MAKING PAPER BAGS.
APPLICATION FILED JUNE 9, 1911.

1,119,244.

Patented Dec. 1, 1914.
9 SHEETS—SHEET 1.

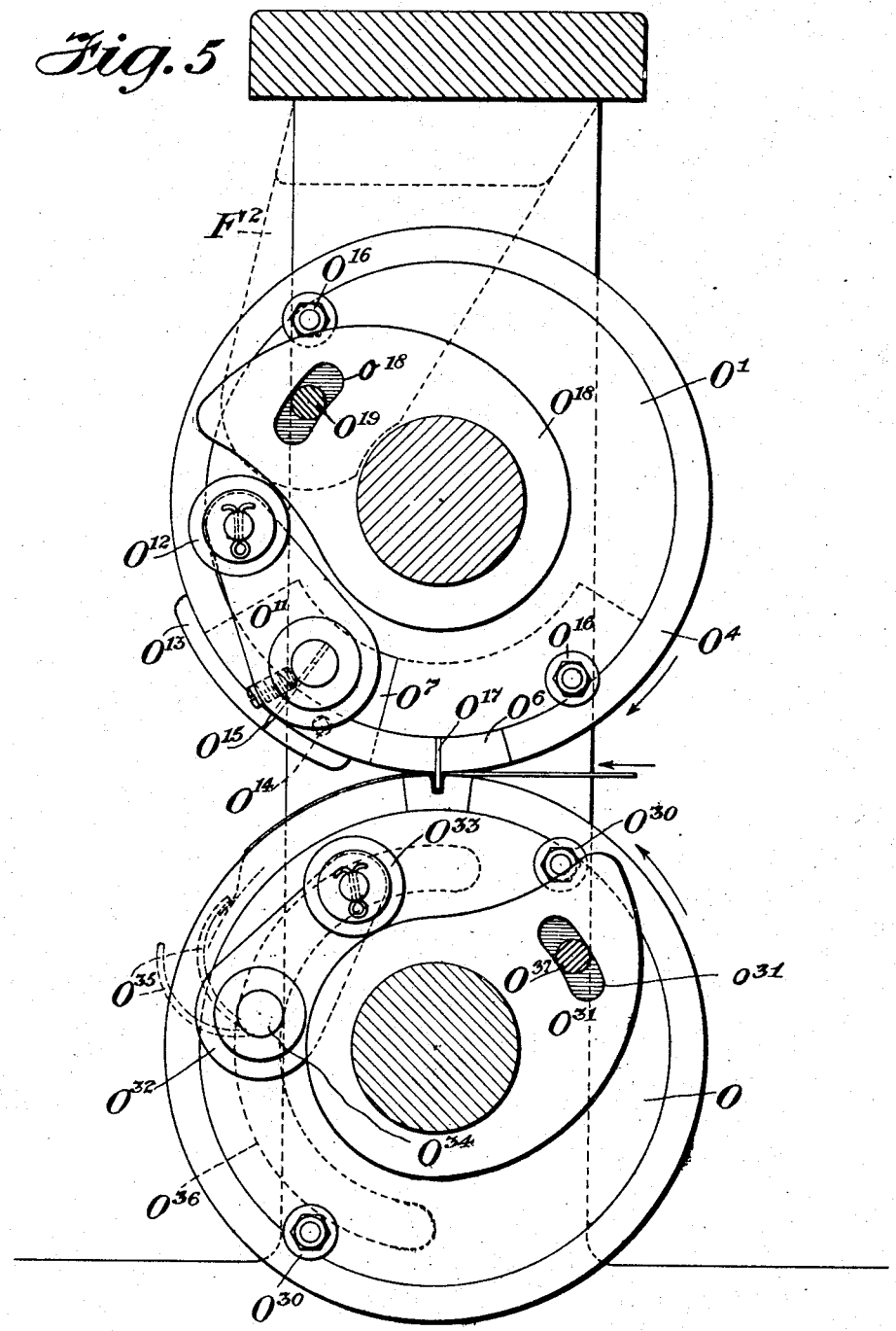

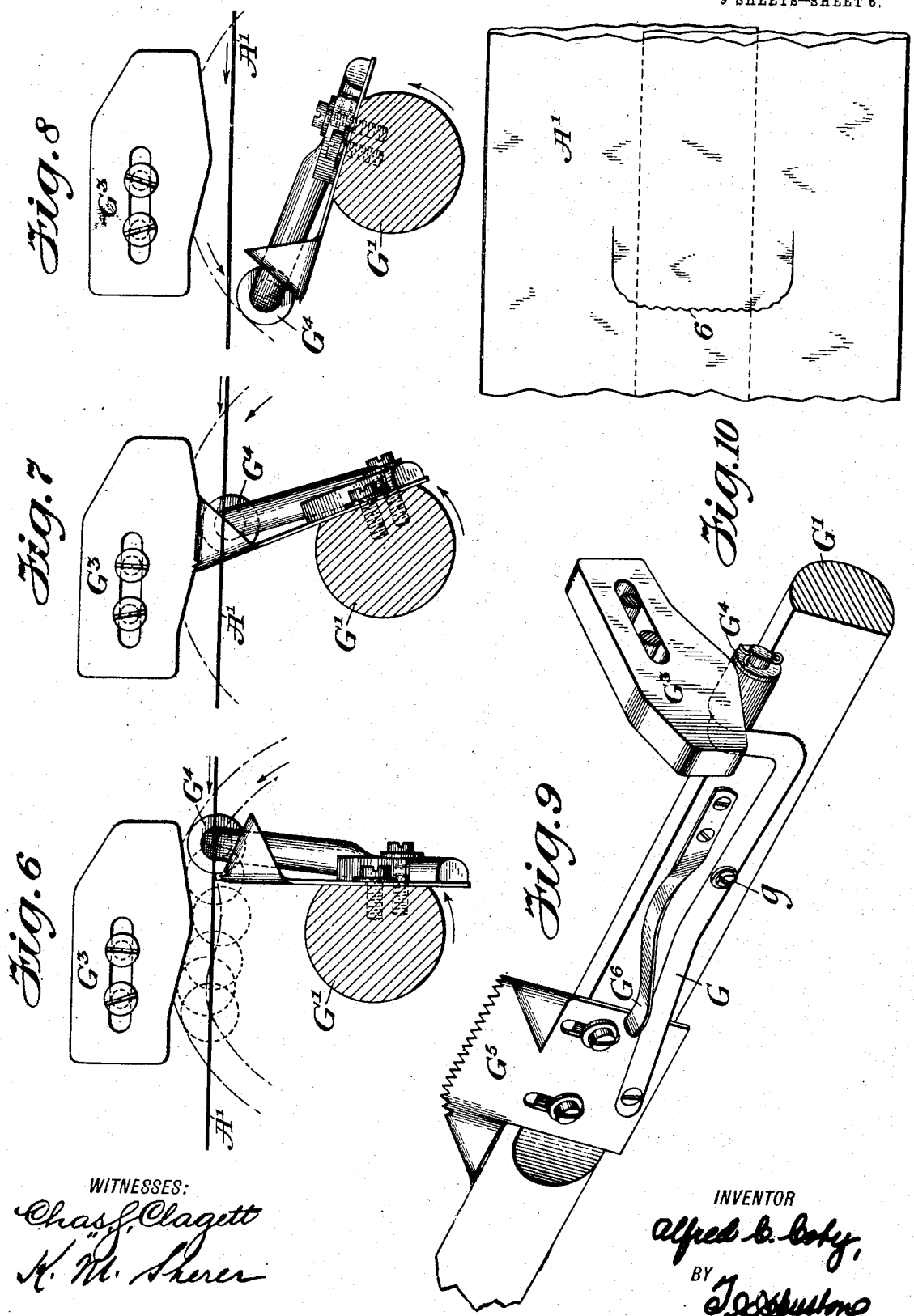

A. C. COTY.
MACHINE FOR MAKING PAPER BAGS.
APPLICATION FILED JUNE 9, 1911.
1,119,244.
Patented Dec. 1, 1914.
9 SHEETS—SHEET 7.
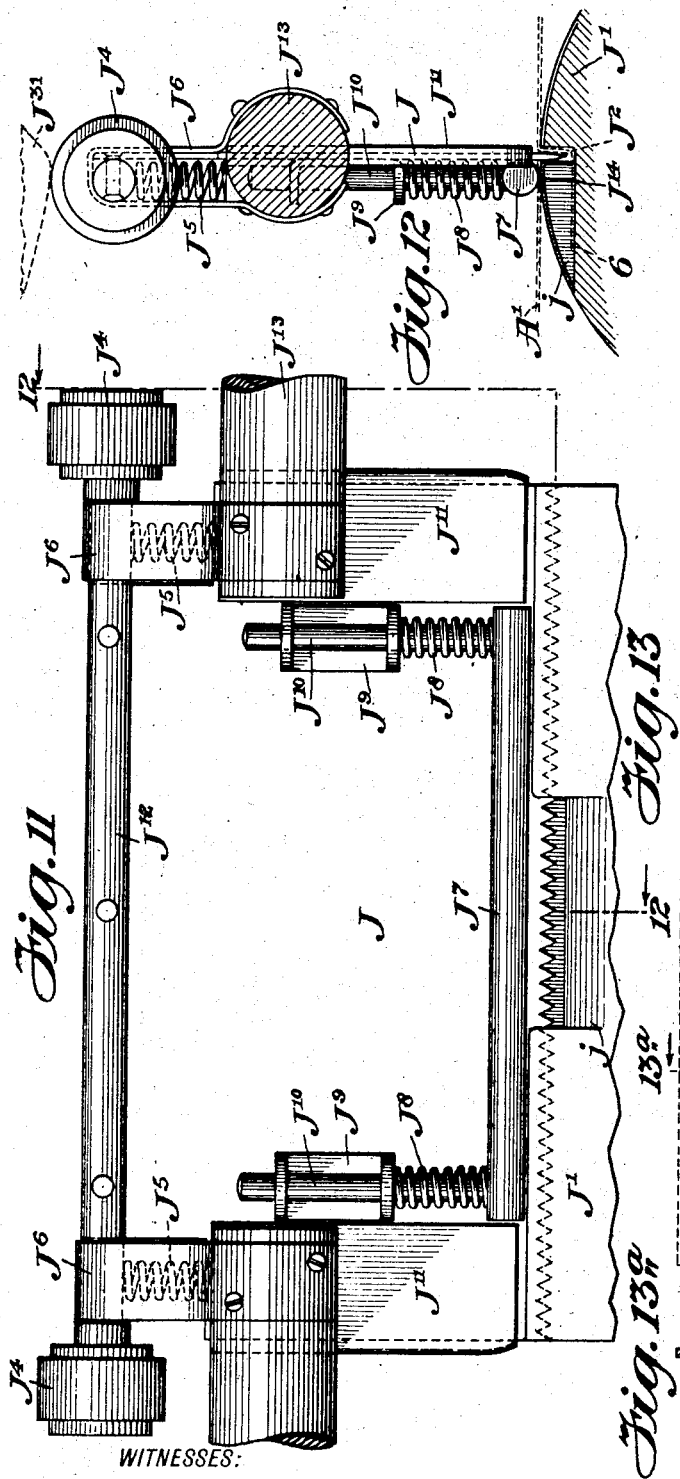
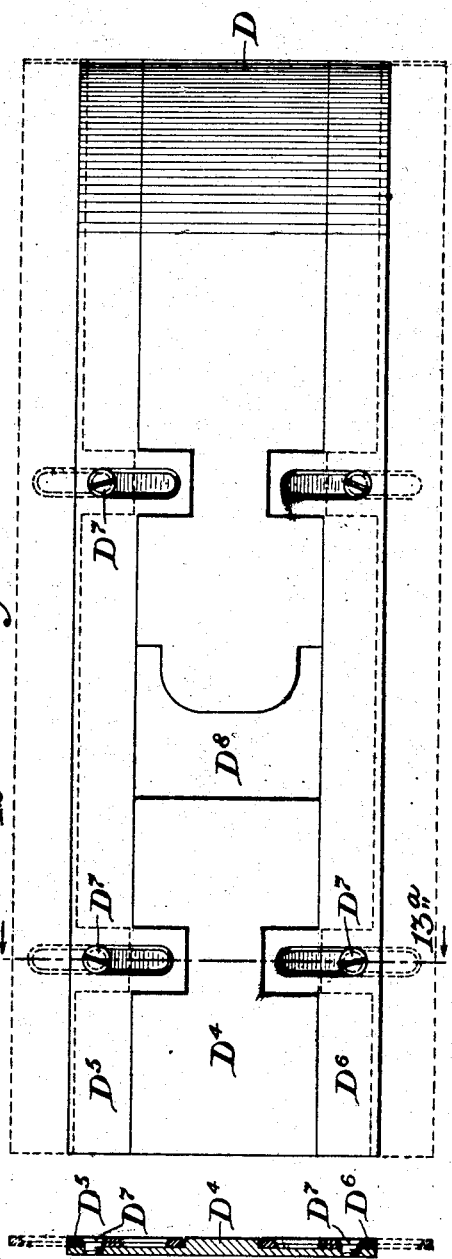
WITNESSES:
Chas. G. Clagett
K. M. Sherer
INVENTOR
Alfred C. Coty.
BY
T. J. Johnston
ATTORNEY.

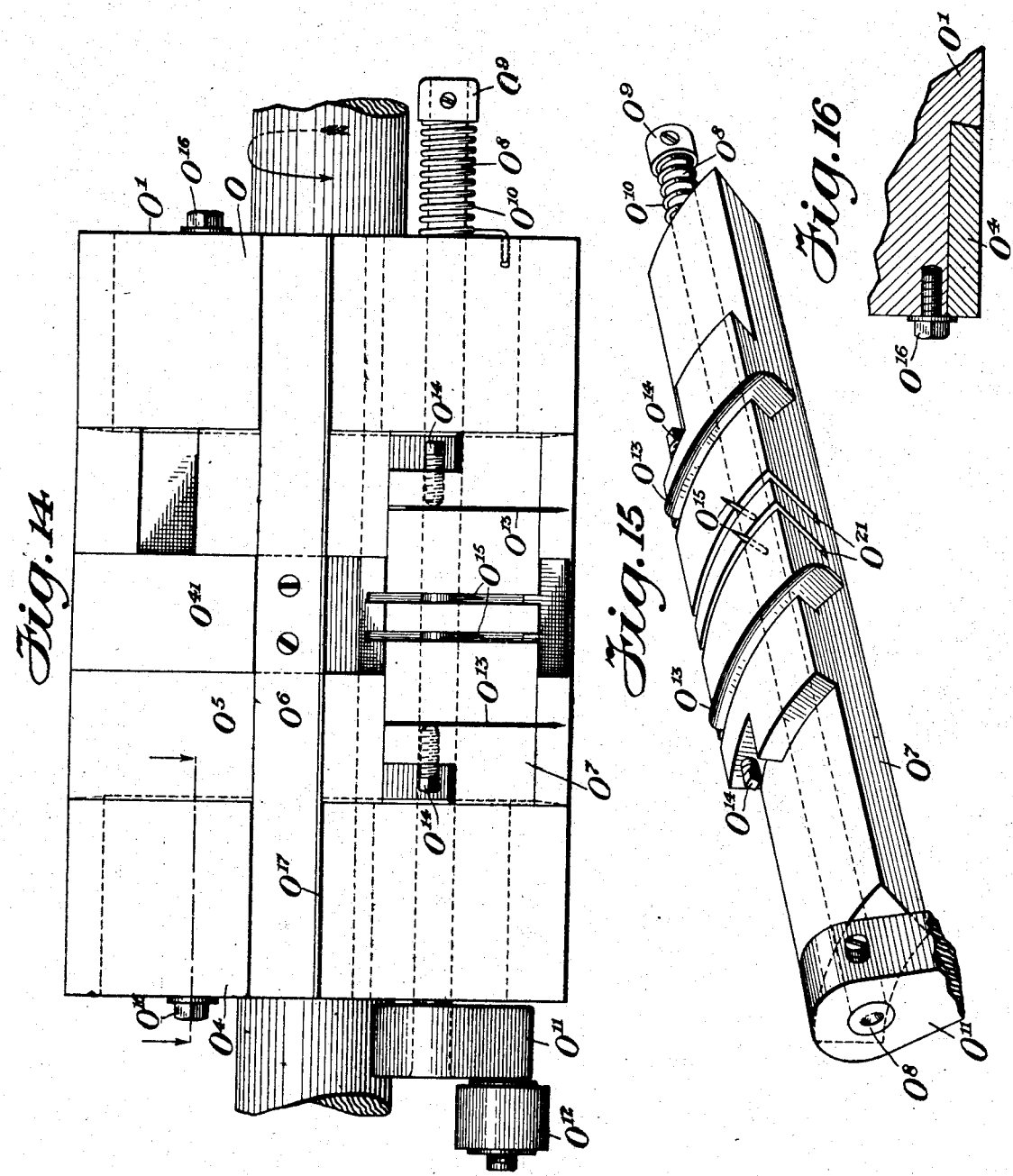

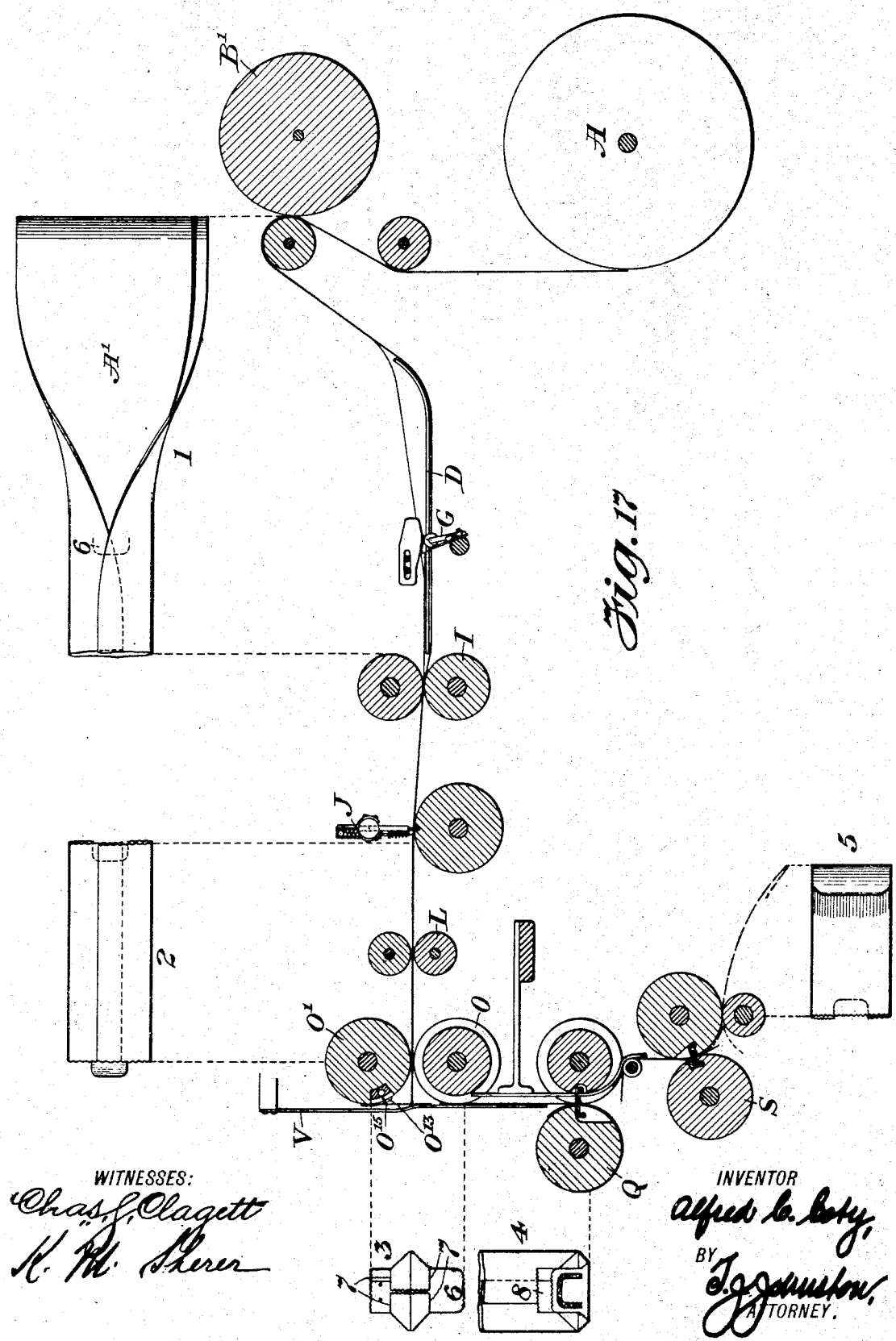

UNITED STATES PATENT OFFICE.

ALFRED C. COTY, OF HUDSON FALLS, NEW YORK, ASSIGNOR OF ONE-FOURTH TO JOSEPH A. LAWSON, OF ALBANY, NEW YORK, AND ONE-FOURTH TO THOMAS H. BURKE, OF HUDSON FALLS, NEW YORK.

MACHINE FOR MAKING PAPER BAGS.

1,119,244.     Specification of Letters Patent.     Patented Dec. 1, 1914.

Application filed June 9, 1911. Serial No. 632,133.

*To all whom it may concern:*

Be it known that I, ALFRED C. COTY, a citizen of the United States, and resident of Hudson Falls, in the county of Washington and State of New York, have invented certain new and useful Improvements in Machines for Making Paper Bags, of which the following is a specification.

My present invention relates to machines for manufacturing paper bags, which are in general old and well-known. The machines, however, with which I am acquainted are subject to some inconveniences and defects which I aim to eliminate in the construction of my invention. Those in common use consist in general of a mechanism for folding the strip of paper longitudinally into a tube, which in its further passage through the machine is cut into suitable shapes, folded and pasted so as to form the bottom of the bag. Prior to the folding in of the bottom a notch is formed in the upper end of the bag, so that when the bag is cut off from the tube the tongue which fits into the notch remains upon the strip and forms a means of engagement with the apparatus as the tube is drawn forward during the forward progress of the strip through the machine.

The means for cutting off the bag which has heretofore been in use depends for its operativeness, in part at least, upon the tension of the strip at the time of cutting off the bag from the tube. This tension must be regulated with considerable accuracy in order to make the machine operative commercially; if it be too tight the cut-off does not work properly and the bag is apt to be torn; while if it be too slack the bag is not separated from the tube at all, but is mutilated. With the cut-off mechanism now in use a certain amount of slack must be left in order to make the device operative, and this slack must be taken up during the further progress of the tube through the machine. This necessitates a variation in the speed of progress of the paper at different parts of the work which makes it at times buckle slightly, the buckling or warping being taken out of the strip by feed rollers or by certain "pinch-bars" as they are called, which engage the strip and draw it forward in its further manipulation. It is a defect in any apparatus which handles paper to have the tension upon the sheet vary, or to use apparatus which makes it move at different speeds in different parts of the operation; because, owing to the irregularity and weakness of all paper and particularly of the cheaper kinds of paper which are used in making paper bags, these variations of speed put sudden strains upon it so that a material which would pass regularly through the machine without being torn, if the progress of the paper were uniform, and which would be abundantly good enough for the purpose to which it is applied, must at times be discarded because it would not stand the variations of speeds. This fact has been well-known in printing houses and in the manufacture of many kinds of paper, which is weak while it is damp; and it has therefore been an object sought in the manufacture of paper bags to perfect a machine in which the material could be passed at uniform speed from the roll to the delivery. So far as I am aware this has not been heretofore obtained.

The losses which follow from the tearing of the paper are not confined to the waste of material, and indeed this constitutes but a small part of the loss due to breaking the continuity of the operation, because if the paper tears (as the machine runs at moderately high speed) a considerable waste accrues before it can be stopped; furthermore, the most important loss comes from the idleness of the machine during the time after it has stopped before it can be started again. The operator has not only to remove the paper which has accumulated and been mutilated, but has to thread the paper through the machine, which is an operation taking considerable time and skill. Particularly is this true with power-driven apparatus, where the rollers must be "inched along", as it is called. Frequent stoppages therefore cut down the output in direct proportion to the time lost in operating the machines. In addition the difficulties pointed out require that the machine shall be run at only moderate speed, because of the comparatively frequent stoppages.

One of the most important features of the invention relates to the steps for cutting off the bag from the tube. For the yielding resistance of the paper, which inevitably varies from time to time in the old constructions, I substitute a fixed resistance, cutting off the paper not against a tension, produced by pinch-bars or by rolls, but by a positive engagement of the paper with the surface of the roller of the cutting mechanism, independent of the knife which coöperates with the roller. To accomplish this feature of the invention I arrange a pressure-bar carried with the knife, which engages with the surface of the roll so that the paper is gripped between the bar and the roll. Immediately adjacent to this pressure-bar is the knife, which is forcibly driven downward below the surface of the roll by a cam, and which has a movement independent of the roll except as to the timing of the rotation of the latter to the gear which forces the upper part of the knife against the cams which cause it to be depressed into a slot in the roll. This cut-off mechanism is so positive that it operates when only the ragged edge of the paper for a small part of its length is engaged by the pressure-bar, which is a result not attainable, as I believe, by any other apparatus now on the market.

Another feature of my invention concerns the knife for cutting the tongue before the bag is cut off. As this occurs while the tube is being formed, this knife operates only upon the underside of the tube; an opening is made in the "former," which confines the solid side of the bag sufficiently to permit the cutting of the tongue by the stroke of the knife, which is a cam-operated device working against the "former" and timed in its revolution so as to strike at the correct position with reference to the length of the bag; the lapped side of the bag is, however, at this time loose enough to prevent its being cut by the knife which forms the tongue, since it has not yet passed through the drawing-rolls, which press down the pasted seam. The knife which cuts off the bag is so timed as to strike a suitable position with regard to the knife which cuts the tongue, so that the bag will be clean severed, yet without cutting off the tongue, as will be subsequently explained.

Another feature of my invention consists in arranging the "former" by which the tube is formed from the paper strip so as to be of adjustable width, whereby bags of different widths in proportion to their length may be manufactured, if desired.

Still another feature consists in spacing the end of the former somewhat away from the feed-rolls by which the paper is drawn forward toward the cut-off, which heretofore has not been possible, on account of variations in speed, above referred to, which have been necessary.

Another important feature is making the bottom-forming mechanism adjustable with reference to the cut-off knife, so that different lengths of bag may be made upon a single machine.

There are other improvements which will be more specifically pointed out in the claims.

An inexperienced person might think that inasmuch as the invention relates to several specific parts of the machine it resides exclusively in such parts and is confined thereto; but this is not the fact. By the adoption of the alterations and improvements in the mechanism I have effected a complete and radical reorganization of the whole machine, which enables me to run it at a considerably higher speed than any with which I am familiar, in fact being able to speed it up to 500 revolutions per minute, making a bag complete at each revolution, whereas the speed of the machines now in use does not run higher than 240; I almost completely eliminate loss from defective bags, since the practically continuous and uniform progress of the material through the machine, combined with the cut-off mechanism so arranged as to put strain upon the paper only in the part of it immediately adjacent to the knife, prevents tearing or buckling; and it is also a fact that my improved machine takes very much less power to operate than any of those which are now in use, standard machines of good construction taking from one to one and a quarter or even one and one-half horse-power, while my machine in the smaller sizes takes but one-eighth, and in larger sizes, but one-quarter, horse-power. Furthermore, the range of adjustment of machines on the market is inconsiderable, at the most only two or three sizes of bag being capable of manufacture commercially upon a given machine; whereas with my improvements three sizes of machine with their adjustments are capable of making all the sizes of bag now in commercial use in the United States. Again, inasmuch as the cut-off does not depend upon the varying tension and speed of the paper, bags may be made of any proportions within the range of adjustment of the machine, even of such absurd proportions (should they be demanded) as an inch in width and eight or ten inches in length, the old machine having a substantially unvarying proportion of width to length and not being capable of much change in this regard without too large a percentage of waste to be practicable. My improved machine therefore consists of means for forming the paper into a continuous tube; means for cutting the tongue in the bottom of the bag; means for cutting the bag from the strip against a fixed resistance; and means for folding in the bottom of the bag, all while passing the paper through the machine with substantially unvarying tension and speed. Of course it is to be understood that the usual pasting apparatus is employed wherever needed in connection with the mechanism which I have devised.

The accompanying drawings show an embodiment of my invention.

Figure 2:
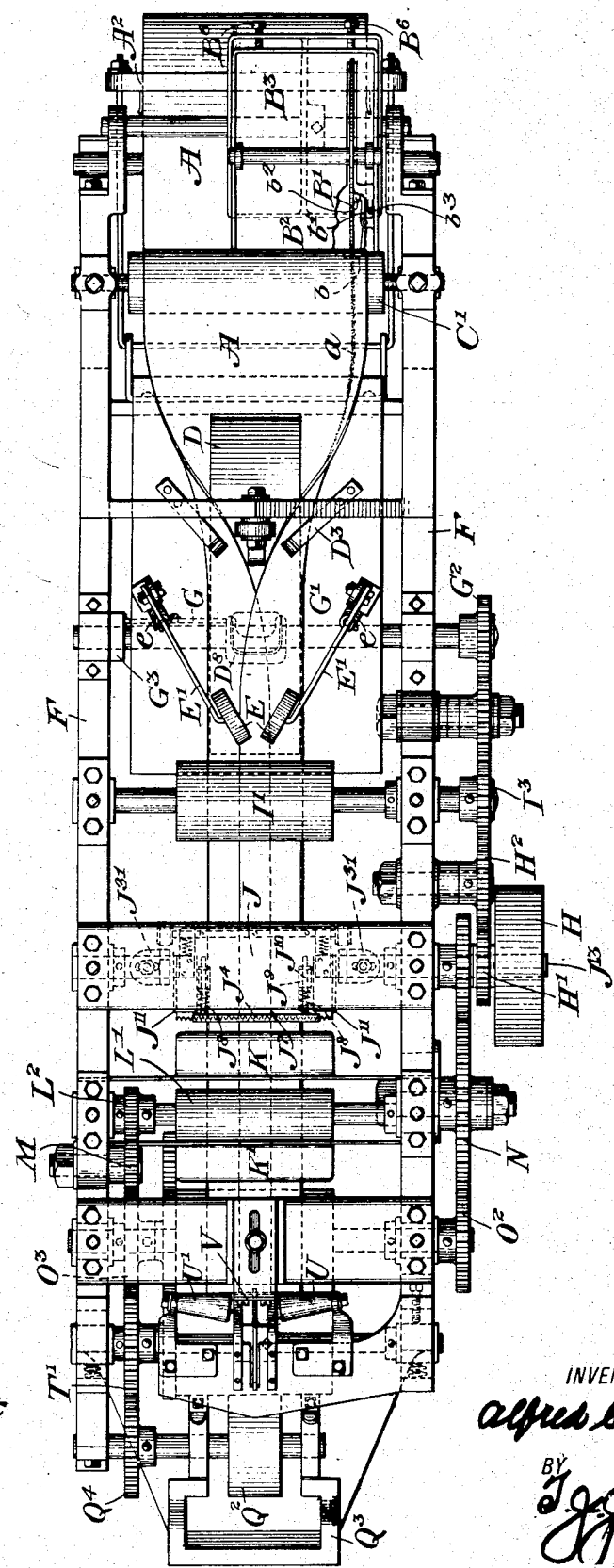

In them Figure 1 is a side elevation. Fig. 2 a plan, and Fig. 3 an end elevation, of a machine containing my improved construction. Fig. 4 is a sectional side elevation with certain parts removed of the bottom-forming rolls and the creasing and pasting rolls. Fig. 5 is a sectional side elevation of the bottom-forming rolls in more detail. Figs. 6 to 9 are detail views showing the construction and operation of the tongue-forming knife. Fig. 10 shows the work done by that knife. Figs. 11 and 12 are respectively an end elevation and a section upon the line 12—12 of Fig. 11, of the cut-off knife. Fig. 13 is a detail of the tube-forming guide or "former". Fig. 13$^a$ is a section of the parts shown in Fig. 13, taken upon the line 13$^a$—13$^a$ of that figure. Figs. 14, 15 and 16 are details of the bottom-forming rolls. Fig. 17 is an illustrative diagram showing the progress of the paper through the machine, which is indicated in the skeleton.

I will now first describe Figs. 1 and 2, giving the general course of the paper through the machine, and afterward will refer more particularly to the detail figures.

A is a roll of paper mounted in any convenient way adjacent to the machine, from which the sheet A$^1$ passes first over rollers C, C$^1$. These are illustrated as having spring boxes C$^2$ C$^2$ because the particular machine from which the drawings were prepared is so equipped, but that is an immaterial detail. While it is passing over the roll C$^1$ paste is applied to the lap by the disk B$^1$ of the paste-pot B; for convenience this is mounted in a pan B$^3$ mounted upon the rod B$^4$ and held in place by the set-screw B$^5$; the paste-pot being secured in the pan by the screws B$^6$ B$^6$ which permit its removal if desired. It will be observed that the position of the disk may be shifted by moving the pan B$^3$ along the bar B$^4$ and fastening it in position; the disk operates by the friction of the paper. In practice the pot is provided with a cover having a slot B$^2$, which is shown partly broken away in Fig. 2. The dirt in the paste accumulates adjacent to this slot until the disk does not rotate easily and the bags may fail to get enough paste to secure them. To prevent this I arrange a bar $b$ in proximity to the slot, the bar being mounted on a lever $b^1$; a cam $b^2$ rotates with the disk and at every revolution thereof bears against the lever $b^1$ and thrusts the bar $b$ across the slot, the spring $b^3$ serving to return the bar when the cam passes.

The sheet A$^1$ passes from the roller C$^1$ to the former D. I find that in practice it is best to have the sheet pass under the former from the roll C$^1$ at an angle of about 45°, since this minimizes the liability to tear. The side of the sheet toward the observer becomes the top in the further progress of the tube, and is directed by the guides D$^2$. The former D is secured upon a block D$^1$ and held by bolts $d$, $d$, in proper position, the bolts securing it to a bracket F$^1$ projecting from the frame F of the machine. Guide rolls E, E assist in drawing the sides of the tube close to the edges of the former, so that the tube is of uniform size; these rollers are set at an angle to the course of the tube, which causes them to crowd the paper over as they revolve. They are carried upon links E$^1$, E$^1$ which are held down by springs $e$, $e$. These springs are secured at one end in line with the centers about which the links move, so that when desired the latter may be turned up and the springs, passing the center, throw them back out of the way while the paper is inserted, or when repairs are being made. While passing through the former the tongue in the bottom of the bag corresponding to the notch left in the top edge is cut by means of a knife G, carried upon the shaft G$^1$ and operated by cams G$^3$, only one of which is shown. The construction and method of operation of this knife will be more fully described in connection with the detail view shown in Figs. 6 to 10.

After passing through the former and being shaped into the tube, the upper edge of which adheres to the lower by means of the paste shown at $a$, in Fig. 2, the tube passes through the "drawing rolls" (as they are called in this art) I, I$^1$, and thence to the cut-off J. This knife J has the usual serrated edge, and is carried upon the shaft J$^3$ through which it passes and in which it has a restricted diametral movement. It is also provided with a pressure-bar J$^7$ which acts in conjunction with a coöperating roller to hold the paper, as presently to be more fully described in connection with the detail view in Figs. 11 and 12. The stroke of this knife is arranged to be in line with the back limit of the tongue formed by the knife G. It is obvious that the knife cuts once in each revolution, and that before it cuts off the bag from the tube, in the ordinary operation of the machine the bottom of the bag will have passed under the knife into the guides K, K and into the drawing rolls L, L$^1$, which are commonly called in the trade "idlers" although they are driven by power, and which serve to draw the paper onward. After leaving these rolls the tube passes through the guides K$^1$, K$^1$, and enters the bottom-forming rolls O, O$^1$. These engage with the tongue on the bottom of the bag and cut the latter in the proper position so that when the tube is forced against the vertical guide V the bottom is opened and folded over. This guide V (shown best in the end elevation, Fig. 3) is slotted and a disk T, called in the trade a "coacher", bears against the roll O, pressing the sheet firmly against it. From this roll the tube now passes between the first and second creaser rolls, Q, Q$^1$. Conical rollers U, U$^1$, (shown best in Fig. 2) bear against the roll O; for clearness of illustration these are omitted from Fig. 1. These rollers are slightly relieved in the center and the larger ends slip slightly on the roll, thus drawing the tube tight. While passing between the first and second creaser-rolls Q, Q$^1$, the paste-roll Q$^2$, revolving in the paste-pot Q$^3$, applies paste to the bottom of the bag by means of the stamp Q″, upon roll Q, shown in Fig. 3, which on one end of a diameter bears against the paper and when at the other end thereof takes paste from the roll Q$^2$ at each revolution. After passing over the idler or guide roll R, the tube passes between the third and fourth creaser-rolls S, S$^1$, which turn in the pasted part of the bag so that the paste is covered, and by means of the roll S$^2$ the bottom of the bag is flattened out against the tube so that the bag will pack flat.

Power is supplied to the machine from the pulley H. In practice it is best to have an electric motor with proper starting-box such as is commonly used in printing apparatus in "threading through", so that the machine may not be started too abruptly; for convenience of illustration, however, I have shown a pulley H, which may be taken as typical of any source of power. In order to make the machine adjustable all of the bottom-forming mechanism to the left of the shaft J$^3$ carrying the knife is in a separate frame which may be moved along on the main frame of the machine; and in order to arrange the cuts of the knives G and J in proper relation to the new size of bag, their gearing must be changed from time to time. It is essential that the gears H$^1$ and G$^2$ shall be of the same size, or rather, of the same number of teeth, and in order to permit their being changed the transmitting gears H$^2$, H$^2$, are carried upon studs and slots in the frame, the slots centering about the shaft I. Similarly, to permit shifting of the bottom-forming mechanism from or toward the gear H$^3$ on the shaft J$^{13}$ of the slotted roll engaging the knife J, the transmission gear N is mounted on a stud in a slot in the frame centering upon the shaft J$^{13}$. In general a single gear-wheel may be so chosen as to furnish all of the adjustment necessary for the sizes of bag which one machine will economically manufacture, but of course this gear may be changed without departing from the invention. The power for the bottom-forming rolls is all communicated to the gear O$^2$, which by means of the gear O$^3$ drives an idler M, and this drives the rolls L, L$^1$ by means of the gear L$^2$ L$^2$. On the other side, the gear O$^3$ meshes with gear T$^1$ of the coacher T, and by means of an idler P the gear O$^2$ drives the second creaser-roll Q$^1$ (see Fig. 1) and through it the first creaser-roll Q. The first, second and fourth creaser rolls have double gears relatively movable, so that they may be adjusted relative to one another; other forms of adjustment may be employed for this purpose. A gear R$^1$ connected to the second creaser-roll Q$^1$ drives the fourth creaser-roll S$^1$, and through it the third creaser-roll S, and the finishing roll S$^2$.

I will now describe the functions and construction of the rolls O, O$^1$ which form the bottom of the bag. They will be best understood from Fig. 5, taken in conjunction with the end elevation in Fig. 3 and the detail views in Figs. 14 and 15. In these figures, O$^1$ is the upper roll, which is subdivided into three parts, a central portion O$^{41}$ to which is secured the creasing blade O$^{17}$ by means of a strip of metal O$^6$. The part O$^{41}$ is integral with portions of the roll at the ends, it being turned off and subsequently filled up to the contour of the roll by rings O$^4$, O$^4$. These are held in place by lag screws O$^{16}$, by slacking which the rings may be moved about the roll, carrying with them the central portion O$^{41}$ and the blade O$^{17}$; the shaded areas in Fig. 14 represent the spaces through which this adjustment may be effected. The object of the adjustment is to form the bottoms of bags of different sizes, to effect which it is necessary to move the creasing blade so as to bring the crease into different positions with reference to the tongue on the bottom of the bag, as will be evident in considering the further progress of the paper through the machine. A block, O$^7$, (see Fig. 15) is inserted in the roll, the rings O$^4$ holding it in place; after it is put in place and the rings are clamped by the screws O$^{16}$, the block revolves with the roll, but does not move relative thereto. It carries blades O$^{18}$, which make the cuts indicated at 7, 7 in the diagram marked 8 in Fig. 17. Passing through the block O$^7$ is a shaft O$^8$ having a spring O$^{10}$ fastened thereto at one end by a collar O$^9$, and the other end of which is secured to the block so that the shaft rocks against the tension of the spring; it is reciprocated by a crank O$^{11}$, carrying a cam-roller O$^{12}$. Slots O$^{21}$ are cut in the block and pins O$^{15}$ are fixed in the shaft and move in the slots. The function of these pins is to engage the bottom of the bag opposite the tongue 6 (see sketch 8 in Fig. 17) and cause it to move upward against the guide V, best shown in Fig. 3, while the tongue moves downward. As will be seen from Fig. 5 the operation of these pins is controlled by a cam O$^{14}$ (which guides the cam-roller $O^{12}$), centered upon the shaft of the roll and held in position (see Fig. 3) by a bolt $O^{19}$ with a butterfly-nut $O^{20}$, operating in a slot $o^{18}$, to hold the cam to a bracket $F^2$, fast to the frame. The timing of the operation of the pins $O^{15}$ is such that when they have opened out the bottom of the bag, so that it impinges against the guide V, they are withdrawn into the slots $O^{21}$, releasing the paper; thus as the tongue 6 passes down it does not tear the bag but draws it down along the guide for further operations. A similar cam, $O^{31}$ adjacent to the lower roll O, operates a cam-roller $O^{33}$ upon a crank $O^{32}$, which in turn operates a rock-shaft $O^{34}$, controlling fingers $O^{35}$; the position of this shaft $O^{34}$ may be altered in the slot $O^{36}$ in the roll O, after it is adjusted in position the shaft rocks, but does not move bodily in the slot. The securing means, of common construction, is not illustrated. A bracket $F^3$, and bolt $O^{37}$ working in slot $o^{31}$ in the cam $O^{31}$, serve to adjust the position of the cam.

Refer now to Figs. 6 to 10. I here illustrate the tongue-forming knife shown at G in Figs. 1 and 2. The knife $G^5$ is shaped to form the tongue and is carried upon an arm G, pivoted at $g$ to a revolving shaft $G^1$. Upon the other end of the lever G is carried a cam roller $G^4$ operated by cam $G^3$ to press up the knife $G^5$ against a spring $G^6$, which bears upon the lever G. It will be obvious that as the shaft $G^1$ revolves the cam-lever is brought against the cam $G^3$ once at each revolution. The timing of this stroke relative to the main shaft of the machine upon which the pulley G exerts its effect is of course determined by the train of gears, shown best in Fig. 1. As these are transmitting gears and do not change the ratio of movement, it will be seen that as long as the first gear upon the main shaft and the gear driving the shaft $G^1$ are of the same number of teeth, these two knives will strike once in each revolution, and in the same fixed relation to the paper from which the bag is formed in its passage through the machine; by adjusting them to strike once at a given point, therefore they will strike consecutively at that position, so that the tongue will be formed and then the bag will be there cut off, leaving the tongue upon one side of the cut and the notch in the top of the bag corresponding to the cut upon the other side. Figs. 6, 7 and 8 show the knife in its different positions. In Fig. 6 it is at its lowest point, the roller $G^4$ being elevated by means of the spring $G^6$ acting upon the other end of the lever; in Fig. 7 the roller $G^6$ is just passing under the lowest part of the cam and the knife is at the top of its stroke; while in Fig. 8 the knife has passed and the roller has been released from the cam. Fig. 10 shows the tube in inverted plan view, illustrating the cut made by the knife.

In Figs. 11 and 12 I show the cut-off mechanism, timed as already explained to operate upon the same point of the paper as the tongue-forming knife $G^5$. This consists of a knife J, having the usual serrated edge, carried upon shaft $J^3$; a reinforcing bar $J^{12}$ is preferably secured to the top of the knife, and this bar carries cam-rollers $J^4$, $J^4$. Springs $J^5$ force the knife up to its normal position; it slides in guides $J^{11}$, $J^{11}$, which revolve with the shaft, and is held in place by yokes $J^6$, $J^6$, shown best in Fig. 12, in which a portion of the cam $J^{31}$ is shown in dotted lines; there is one of these cams upon each side of the machine. Attached to and moving with the knife is a bar $J^7$, pressed down by springs $J^8$ through which pass spindles $J^{10}$ carried in the guides $J^9$. The knife coöperates with the roll $J^1$, having a slot $J^2$, into which the knife is depressed as it rotates. The roll is relieved at $j$ so that the tongue which has been cut upon the under side of the tube will not be acted upon by the knife J, and reinforced at $J^{14}$.

The operation of these parts is as follows: As the roll $J^1$ and the knife J, which are geared so as to revolve together, turn about their axes, the bar $J^7$, which is in advance of the knife, first engages the paper against the protected portion $J^{14}$ of the roll adjacent to the slot; at this time the knife is at the upper part of its stroke, entirely clear of the roll and of the bar, so that the springs of the bar are compressed by the further rotation until it occupies the position shown in Fig. 12. This engages the paper $A^1$ firmly, and just as this engagement is with the greatest security the rollers $J^4$ come in contact with the cams $J^{31}$ and force the knife with a sharp and sudden motion downward into the slot $J^2$, severing the bag; but as will be seen in Fig. 12, the tongue 6 at this time lies in the relieved portion $j$ of the roll $J^1$, so that it is not acted upon by the knife.

It is of course not important that the bar shall be carried by the knife, as it may be operated in synchronism with the latter by other methods, but in practice it is simplest and easiest to have them work in a unitary structure, as thus they are not likely to get out of adjustment. I regard such changes of construction as equivalent for the purpose of my invention.

My improved cut-off mechanism differs from any with which I am acquainted in that the knife has a movement in space, or as mathematicians term it, a movement of translation, toward and from the roll with the slot in which it coöperates. Knives revolving so as to mesh with the slot in a roll have heretofore been employed, but they are inefficient and objectionable for reasons some of which I have pointed out in my statement of invention. I prefer to have this movement of translation in the plane of the knife, which makes its direction substantially radial to the shaft about which it revolves, and also to the roll with which it coöperates, because this is the simplest movement and one which is efficacious and easily obtained; but it is obvious that the cut might be made at an angle without departing from the invention; and when I employ in the claims the term "movement of translation" I mean to designate the motion of the knife bodily toward and from the roll with which it coöperates, regardless of such minor differences as I have here pointed out.

Figure 3:
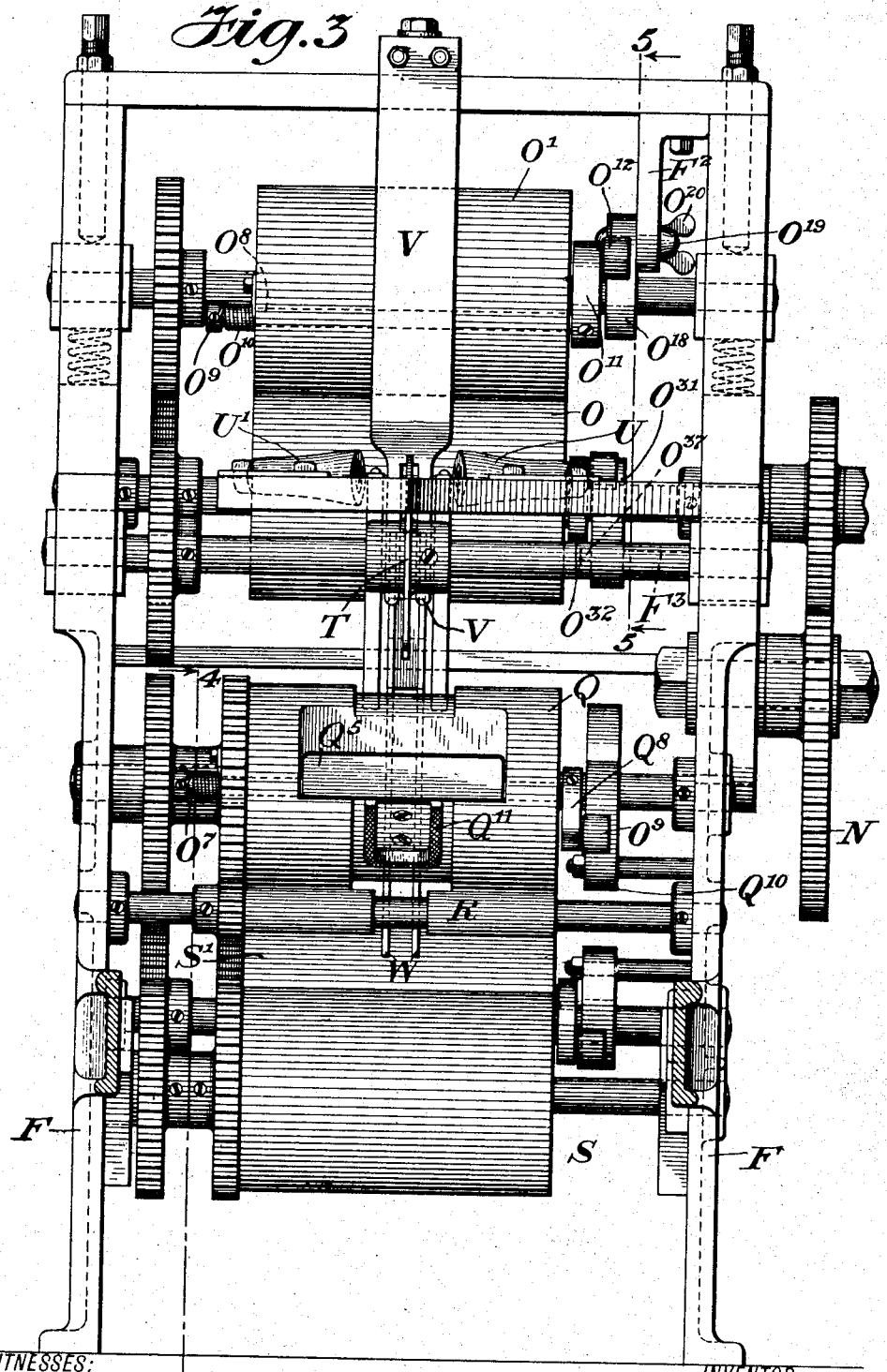
Figure 4:
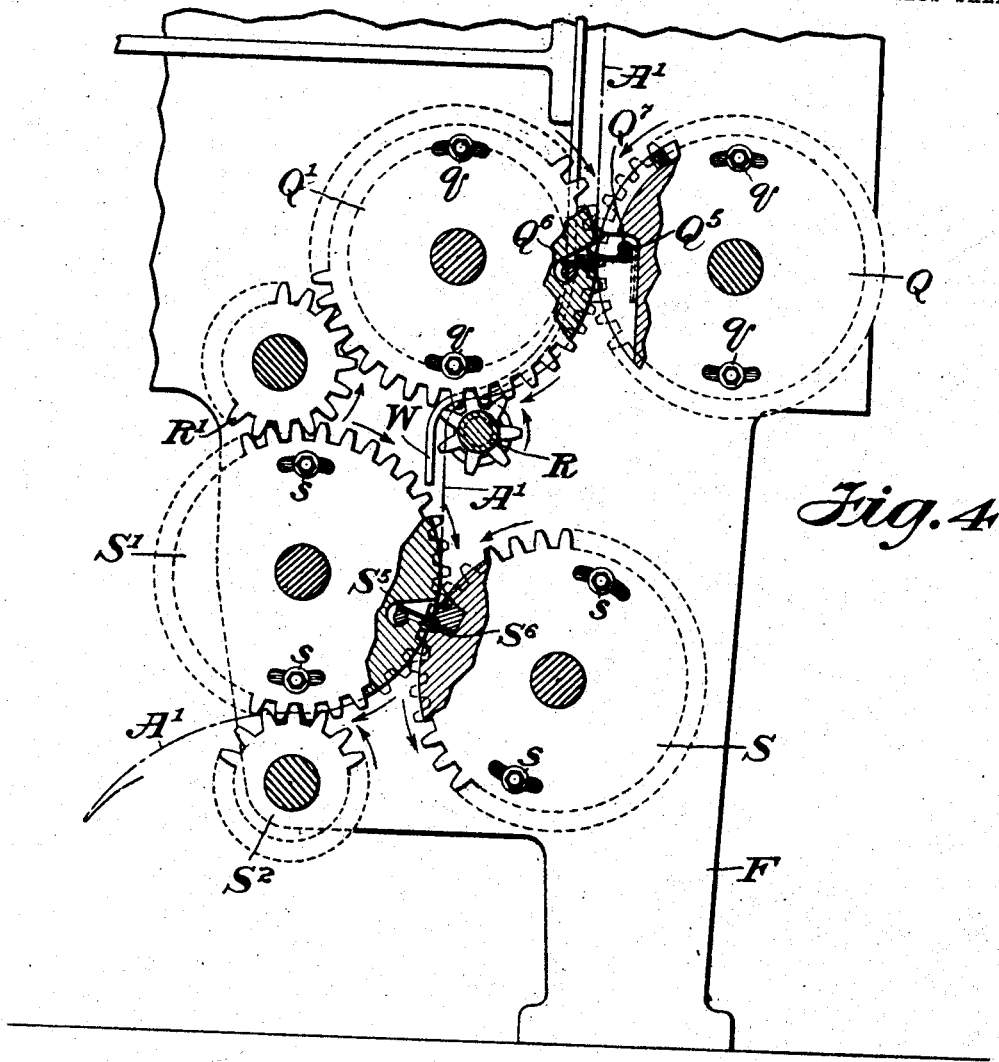

Referring now to Figs. 3 and 4, I illustrate the creasing and pasting mechanism which forms and seals the bottom of the bag. The sets of rolls marked Q and S are of substantially similar construction, except that the roll Q carries the pasting mechanism. Their method of operation is also somewhat like that of the rolls O, inasmuch as the creasing mechanism carried by the roll is operated by a stationary cam and a cam roller. The roll Q carries a creasing blade $Q^3$ mounted upon a shaft $Q^7$ operated by a crank $Q^8$ carrying the cam roller $Q^9$, operated by the cam $Q^{10}$; while the roll $Q^1$ carries a similar creasing blade $Q^4$, the cam and crank of this blade does not appear, being concealed (in Fig. 3) behind cam $Q^{10}$. As will be observed these rolls are adjustable with reference to one another by means of the lag-screws $q$, $q$, which enable them to be moved relative to their gears and then secured in place. The roll Q at $Q^{11}$ carries a brass U-shaped stamp which is supplied with paste by the paste-roll $Q^2$ (shown in Figs. 1 and 2, but removed in Figs. 3 and 4 for clearness of illustration). The roll R is merely a guide roller. The construction of the second pair of creaser-rolls $S^1$ is substantially the same as that of Q, $Q^1$, and finishing roll $S^2$ serves to press down the flap at the bottom of the bag to cover up the paste, and turn the bottom flat against the bag so that the latter may pack easily. Guides W, W, formed usually of stiff brass wire, are arranged adjacent to the recessed portion of the roll Q, and the bag travels between these guides and the guide V until it enters the first pair of creasing-rolls Q $Q^1$; thence it is directed by the guides W to the second pair of creaser-rolls, which receive their power through the pinion $R^1$; these creasing-rolls being of common construction further and more elaborate description seems unnecessary.

Referring now to Figs. 13 and $13^a$, I show the means which I have provided for adjusting the width of the former, so that bags of different widths may be made upon the same machine. In these figures, D is the general reference letter describing the former, which is provided with a slot $D^3$ for the tongue-forming knife; the central portion of the former is lettered $D^4$, and it is extensible by means of portions $D^5$ $D^6$, one upon each side thereof, which are attached to the central portion by screws $D^7$ $D^7$. In practice in adjusting the width the screws are slacked and the parts $D^5$ $D^6$ adjusted to the desired position. Afterward the screws are tightened. As shown in the sectional view, Fig. $13^a$, the slides only take up part of the thickness of the central portion $D^4$; while this leaves the former of different thicknesses in different parts of its width, this is of no practical importance.

In its best embodiment and for reasons already pointed out, my invention employs a uniform progression of the material through the machine, as this causes the least stoppage and waste of material and time; but it is obvious that the general arrangement of the machine, embodying the novel points in its mechanism which I have described, might be employed without availing one's self of this advantage, yet without departing from the invention; its superiority is manifest, even where the paper runs with varying speed and tension. All such modifications I aim to cover by my claims.

Having thus described my invention, what I claim and wish to protect by Letters-Patent of the United States is:

1. A machine for making paper bags, comprising means for forming a strip of paper into a tube; means for pasting the edges of the tube; means for cutting a tongue on the tube; means, consisting of a slotted roll and a knife carrying a bar for engaging the paper and having a movement of translation into and out of the slot, for cutting off the bag from the tube; means for cutting and folding the bottom of the tube; and means for pasting and pressing the bottom in place.

2. A machine for making bags, comprising means for forming a strip of material into a tube; means for pasting the edge of the tube; means for cutting a tongue thereon, means, consisting of a slotted roll and a knife having a movement of translation into and out of the slot, for cutting off the bag from the tube; means, engaging the material adjacent to the edge of the knife, for holding it during the cutting; means for cutting and folding the bottom of the tube; and means for pasting and pressing the bottom in place.

3. A machine for making paper bags, comprising means for forming the paper into a tube; means for pasting the lap of the tube; means for cutting a tongue thereon;

a cut-off mechanism comprising a slotted roll and a knife geared to revolve synchronously with the roll, the knife having a movement of translation into and out of the slot; a presser bar engaging with the edge of the slot and holding the paper in place during the cut of the knife; means for cutting and folding the bottom of the tube, and means for pasting and pressing it in place.

4. A machine for making paper bags, comprising means for forming a strip of paper into a tube; means for pasting the lap of the tube; means for cutting a tongue on the tube; means, consisting of a slotted roll and a knife having a movement of translation into and out of the slot, for cutting off the bag from the tube, the knife geared to the roll so as to revolve synchronously therewith, and being provided with cam rollers and cams fastened to the frame of the machine for operating the knife, with springs for returning it to its normal position; means, adjustable toward and from the knife, for cutting and folding the bottom of the tube, and means for pasting and pressing it in place.

5. In a machine for making paper bags, the combination of rolls and a former for folding a strip of paper into a tube; means for pasting the lap; a knife acting upon the under side of the tube and shaped to leave a tongue upon one side of the cut; a knife having a spring-pressed bar coöperating with a slotted roll for holding and severing the bag from the tube; means for cutting the bottom of the bag to shape; means for folding the bottom of the bag; and means for pasting it in place.

6. A machine for making paper bags, comprising means for forming the paper into a tube; means for pasting the lap of the tube; means for cutting a tongue thereon; a cut-off mechanism consisting of a knife having a movement of translation relative to a coöperating roll and timed to cut off the bag at the root of the tongue without cutting off the tongue; means engaging the paper immediately adjacent to the cut-off mechanism to hold it firmly while the cut is made; means for cutting and folding the bottom of the bag, and means for pasting and pressing it in place.

7. A machine for making paper bags, comprising means for forming the paper into a tube, such means being adjustable so that different widths of bags may be made upon the same machine; a knife for cutting a tongue upon the tube; a cut-off mechanism comprising a slotted roll, a knife having a movement of translation into and out of the slot, cam rollers and cams for pressing the knife into the slot, the cut-off mechanism timed to cut off the bag at the root of the tongue without cutting off the tongue; means for cutting and folding the bottom of the bag, and means for pasting and pressing it in place.

8. A machine for making paper bags, comprising a former for forming the material into a tube, the former being of adjustable width so as to permit the making of different widths of bag upon the same machine; means for pasting the lap of the tube; a knife for cutting a tongue upon the tube; a cut-off mechanism comprising a slotted roll, the roll having a relieved portion in which the tongue may lie, a knife geared to rotate synchronously with the roll and having a movement of translation into and out of the slot, cam rollers upon the knife and cams upon the frame of the machine pressing the knife into the slot, and a spring or springs for restoring the knife to its normal position; means for cutting and folding the bottom of the bag, and means for pasting and pressing it in place.

9. A machine for making paper bags, comprising means for forming paper into a tube, such means consisting of a former containing a slot; a tongue-forming knife, striking through the slot, the slot being shaped to conform approximately to the contour of the knife, the knife striking the underside of the tube, the slot acting to hold in place the under side of the tube while the upper side is left free; a cut-off mechanism; gearing between the cut-off mechanism and the tongue-forming knife arranged to operate them in synchronism so that the cut-off mechanism acts at the root of the tongue; means for cutting and folding the bottom of the bag, and means for pasting and pressing it in place.

10. A machine for making paper bags, comprising means for forming paper into a tube, such means consisting of a former having a slot therein, a tongue-forming knife striking through the slot against the under side of the tube, the slot being shaped to conform approximately to the contour of the knife; a cut-off mechanism; gearing between the tongue-forming knife and the cut-off mechanism timed to cause the latter to act as the root of the tongue passes thereunder; means in the cut-off mechanism for preventing its action upon the tongue; means for cutting and folding the bottom of the bag, and means for pasting and pressing it in place.

11. A machine for making paper bags, comprising a former for shaping a strip of paper into a tube; a knife for cutting a tongue upon the tube, the knife carried by a revolving shaft and having a cam roller carried by the shaft and a cam upon the frame of the machine for causing the knife to strike once at each revolution; a cut-off mechanism comprising a slotted roll and a revolving knife having a movement of translation into and out of the slot; gearing between the tongue-forming knife and the cut-off mechanism timed to cause the cut-off to act at the root of the tongue; means for preventing the cutting off of the tongue by the cut-off mechanism; means for cutting and folding the bottom of the bag, and means for pasting and pressing it in place.

12. A machine for making paper bags, comprising means for forming the paper into a tube, consisting of a former of adjustable width; a slot in the former, a tongue-forming knife striking through the slot against the under side of the tube, the slot acting to hold in place the under side of the tube while leaving the upper side free so that the knife does not act thereon; a cut-off mechanism timed to cut off the bag at the root of the tongue; means for cutting and folding the bottom of the bag, and means for pasting and pressing it in place.

13. In a machine for making paper bags, the combination of rolls and a former for shaping a continuous strip of paper into a tube; means for applying paste to the lap; a cam-operated knife for cutting a tongue at desired places in one side of the tube; a cut-off mechanism, timed to act at the root of the tongue, consisting of a slotted roll, a knife having a movement of translation into and out of the slot, and means for operating the knife; means for forming the bottom of the bag, and means for pasting and pressing it in place, these two instrumentalities being jointly adjustable toward and from the cut-off knife, so as to make bags of different lengths; all of the said several means being so timed and acting that the passage of the strip of material through the machine from the beginning to the end of the operation is at substantially a uniform rate.

14. In a machine for making bags, a former of adjustable width comprising a central portion containing a slot of substantially the contour of a tongue-forming knife forming part of the machine, side portions adjustable laterally and set screws for holding the parts together, the side portions being of such width as not to interfere with the slot.

In witness whereof, I have hereunto set my name in the presence of two witnesses.

ALFRED C. COTY.

Witnesses:
 EDWARD KAESTNER,
 BORDEN H. MILLS.